United States Patent
Zhang et al.

(10) Patent No.: US 7,263,660 B2
(45) Date of Patent: Aug. 28, 2007

(54) SYSTEM AND METHOD FOR PRODUCING A VIDEO SKIM

(75) Inventors: Hong-Jiang Zhang, Beijing (CN); Dong Zhang, Beijing (CN)

(73) Assignee: Microsoft Corporation, Redmond, WA (US)

(*) Notice: Subject to any disclaimer, the term of this patent is extended or adjusted under 35 U.S.C. 154(b) by 1323 days.

(21) Appl. No.: 10/112,198

(22) Filed: Mar. 29, 2002

(65) Prior Publication Data
US 2003/0184579 A1   Oct. 2, 2003

(51) Int. Cl.
G06F 3/00 (2006.01)
(52) U.S. Cl. ................................ 715/723; 715/725
(58) Field of Classification Search ............ 715/716, 715/723; 375/240.09; 348/700, 701; 382/173, 382/305
See application file for complete search history.

(56) References Cited

U.S. PATENT DOCUMENTS

| | | | |
|---|---|---|---|
| 5,664,227 A | 9/1997 | Mauldin et al. | |
| 6,108,448 A | 8/2000 | Song et al. | |
| 6,115,070 A | 9/2000 | Song et al. | |
| 6,996,171 B1* | 2/2006 | Walker et al. | 375/240.09 |
| 2002/0126143 A1* | 9/2002 | Bae et al. | 345/723 |
| 2004/0125124 A1* | 7/2004 | Kim et al. | 345/716 |

OTHER PUBLICATIONS

HongJiang Zhang, JianHua Wu, Di Zhong and Stephen W. Smoliar, "An Integrated System for Content-Based Video Retrieval and Browsing," Pattern Recognition, vol. 30, No. 4, pp. 643-658, 1997.
Yueting Zhuang, Yong Rui, Thomas S. Huang and Sharad Mehrotra, "Adaptive Key Frame Extraction Using Unsupervised Clustering," IEEE International Conference on Image Processing, 1998(ICIP98), Oct. 1998, Chicago, IL, USA.

* cited by examiner

Primary Examiner—Weilun Lo
Assistant Examiner—Truc T. Chuong
(74) Attorney, Agent, or Firm—Lee & Hayes, PLLC (57) ABSTRACT

A video skim is assembled by identifying one or more key frames from a video shot. Certain lengths of frames to the left and right of the key frame are measured for visual content variety. Depending upon the measured visual content variety to the left and right of the key frame, the video skim is assembled that has L frames to the left of the key frame and R frames to the right of the key frame. Measuring the visual content variety to the left and right of the key frame, provides a video skim that incorporates the more salient features of a shot.

29 Claims, 7 Drawing Sheets

SYSTEM AND METHOD FOR PRODUCING A VIDEO SKIM

TECHNICAL FIELD

This invention relates to video observation technology, and more particularly, to video skimming.

BACKGROUND

Digital video is rapidly becoming an important source for information entertainment, among which home video probably constitutes the type of information entertainment that many people are increasingly becoming interested. With the size of home video collections growing, technology is needed to effectively browse videos in a short time without losing the content, especially the salient content of the video. "Video skimming" is such a technique that extracts compact, content rich abstractions of longer videos. Ideally, a video skim preserves the essential content summarizing an original video in a compact representation. The compact representation should greatly reduce viewing time and assist the viewer in determining whether to view the video in an uncondensed format or perhaps to categorize the video or segments of the video.

One technique used for creating video skims, increases the frame rates across the whole video. This "fast forward" approach might achieve a tenfold decrease in viewing time, but seriously degrades coherence, perturbing audio information and distorting visual information.

Another approach used for creating video skims is to drop frames at regular intervals, but preserve the source video frame rate to overcome the "fast forward" approach. Unfortunately, this approach often omits essential information because such essential information is often found in the frames that are dropped at the regular intervals.

Still another approach discards shots either randomly or selectively. This approach may provide decent results for an entertainment movie. It does not, however, lend itself to home video material, because home videos often document people's lives where all shots are more or less equally important. Thus, randomly or selectively discarding shots does shorten the video for a video skim, but often omits material that is important to the viewer.

SUMMARY

A system and method for assembling a video skim is described. In one described implementation, one or more key frame(s) is identified in a video segment of frames. Certain lengths of frames to the left and right of the key frame(s) are measured for visual content variety. Depending upon the measured visual content variety to the left and right of the key frame, a video skim is assembled that has L frames to the left of the key frame and R frames to the right of the key frame. In most instances, the number of frames to the left or right side is determined by applying an unequal weighted window to both sides of the key frame. The unequal weighted window favors the side (more frames are selected from one side of the key frame than another) having a greater visual content variety.

The described implementations, therefore, introduce the broad concept of locating one or more key frames that represents the salient content of a segment of frames. Then by measuring the visual content variety to the left and right of the key frame, a video skim can be generated that incorporates the more salient features of a segment of frames based on the visual content variety to the left and right of the key frame.

BRIEF DESCRIPTION OF THE DRAWINGS

The detailed description is described with reference to the accompanying figures. In the figures, the left-most digit(s) of a reference number identifies the figure in which the reference number first appears.

DETAILED DESCRIPTION

The following discussion is directed to systems and method for producing a video skim. The subject matter is described with specificity to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Overview

Figure 1:
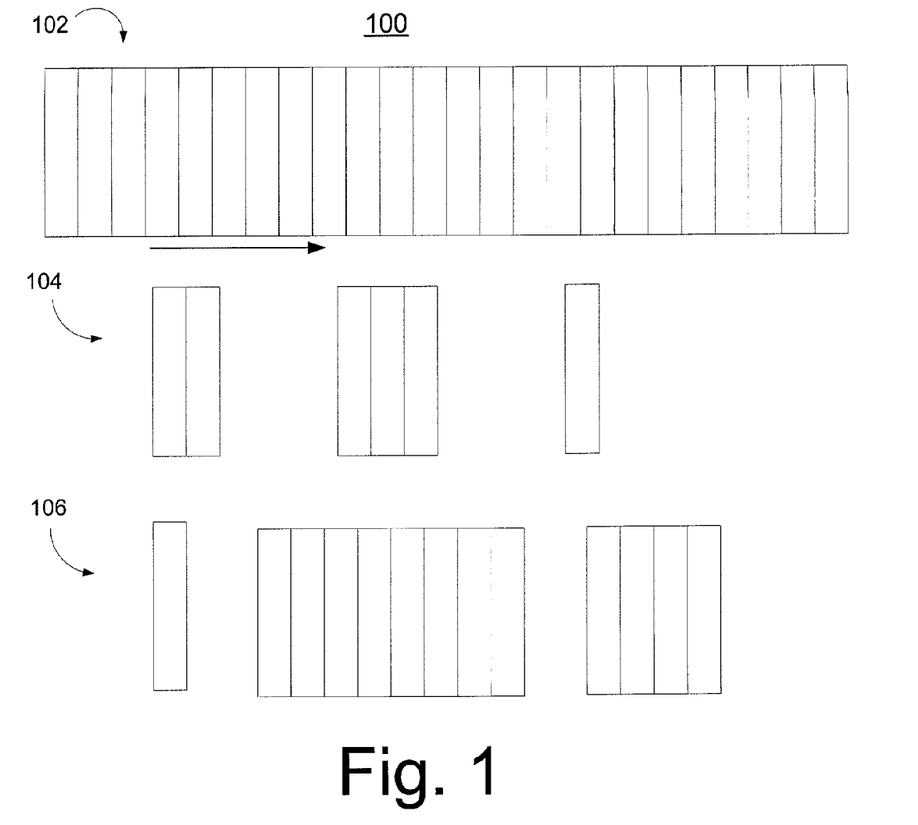
FIG. 1 is a high-level representation showing how a lengthy video can be mapped into skims.

FIG. 1 is a high-level representation showing how a lengthy video 102 is mapped into skims 104. The lengthy video 102 represents any number of frames (or segments of frames) N that represent the entire length of a video content. Shown in the second row are skims 104, which are a reduced number of frames (or segments of frames) N-R that concisely represent the salient content of the lengthy video 102, while at the same preserving the original frame rate of the length video 102. Shown in the third row are discarded video frames (or segments of frames) 106 with less important content. The discarded frames 106 are skipped when a viewer views the skims 104 during view time. As shall be explained in more detail, the implementations described below, among other things, distinguishes video segments containing frames with important content to those with less important content.

Exemplary Platform Host

Figure 2:
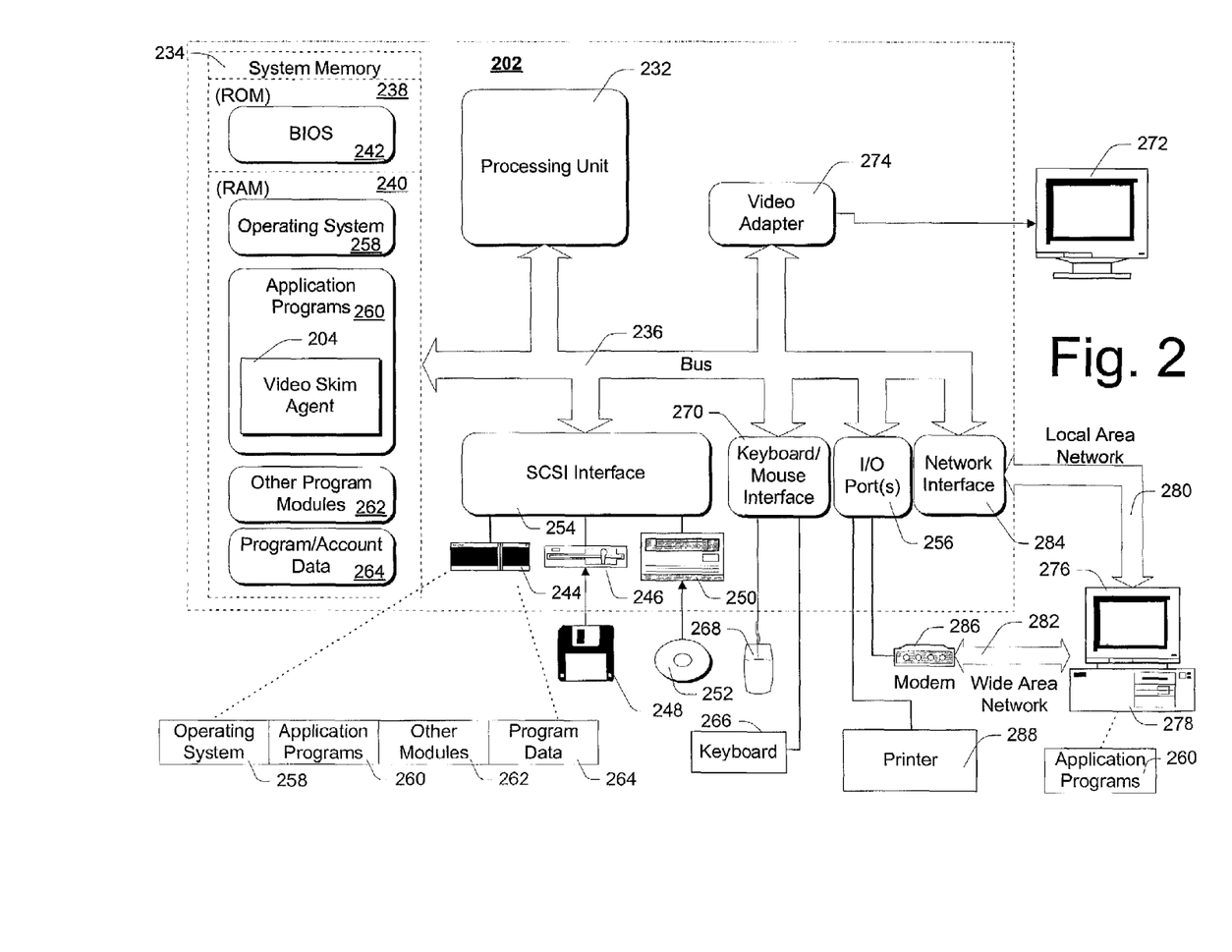
FIG. 2 illustrates an example computer that hosts a video skim agent.

FIG. 2 illustrates an example computer 202 that hosts a video skim agent 204 that shall be described in more detail below. It will be evident, from the discussion to follow, that computer 202 is intended to represent any of a class of general or special purpose computing platforms which, when endowed with the video skim agent 204, implement the teachings of the present invention in accordance with the first example implementation introduced above. It is to be appreciated that although analysis agent 204 is depicted in the context of FIG. 2 as a software application, computer 202 may alternatively support a hardware implementation of agent 204 as well. In this regard, but for the description of analysis agent 204, the following description of computer 202 is intended to be merely illustrative, as computers of greater or lesser capability may well be substituted.

For example, computer 202 may be implemented as any video observation device capable of viewing videos such as computers, personal computers, server computers, hand-held or laptop devices, portable communication devices, multiprocessor systems, microprocessor systems, microprocessor-based systems, consumer electronics devices, VCRs, video media players, video-on-demand devices, and other related devices.

Referring back to the general exemplary implementation, computer 202 includes one or more processors or processing units 232, a system memory 234, and a bus 236 that couples various system components including the system memory 234 to processors 232.

The bus 236 represents one or more of any of several types of bus structures, including a memory bus or memory controller, a peripheral bus, an accelerated graphics port, and a processor or local bus using any of a variety of bus architectures. The system memory includes read only memory (ROM) 238 and random access memory (RAM) 240. A basic input/output system (BIOS) 242, containing the basic routines that help to transfer information between elements within computer 202, such as during start-up, is stored in ROM 238. Computer 202 further includes a hard disk drive 244 for reading from and writing to a hard disk, not shown, a magnetic disk drive 246 for reading from and writing to a removable magnetic disk 248, and an optical disk drive 250 for reading from or writing to a removable optical disk 252 such as a CD ROM, DVD ROM or other such optical media. The hard disk drive 244, magnetic disk drive 246, and optical disk drive 250 are connected to the bus 236 by a SCSI interface 254 or some other suitable bus interface. The drives and their associated computer-readable media provide nonvolatile storage of computer readable instructions, data structures, program modules and other data for computer 202.

Although the example operating environment described herein employs a hard disk 244, a removable magnetic disk 248 and a removable optical disk 252, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk 244, magnetic disk 248, optical disk 252, ROM 238, or RAM 240, including an operating system 258, one or more application programs 260 including, for example, analysis agent 204 incorporating the teachings of the present invention, other program modules 262, and program data 264 (e.g., resultant language model data structures, etc.). A user may enter commands and information into computer 202 through input devices such as keyboard 266 and pointing device 268. Other input devices (not shown) may include a microphone, joystick, game pad, satellite dish, scanner, or the like. These and other input devices are connected to the processing unit 232 through an interface 270 that is coupled to bus 236. A monitor 272 or other type of display device is also connected to the bus 236 via an interface, such as a video adapter 274. In addition to the monitor 272, personal computers often include other peripheral output devices (not shown) such as speakers and printers.

As shown, computer 202 operates in a networked environment using logical connections to one or more remote computers, such as a remote computer 276. The remote computer 276 may be another personal computer, a personal digital assistant, a server, a router or other network device, a network "thin-client" PC, a peer device or other common network node, and typically includes many or all of the elements described above relative to computer 202, although only a memory storage device 278 has been illustrated in FIG. 2. In this regard, innovative analysis agent 204 may well be invoked and utilized by remote computing systems such as, for example, computing system 276.

As shown, the logical connections depicted in FIG. 2 include a local area network (LAN) 280 and a wide area network (WAN) 282. Such networking environments are commonplace in offices, enterprise-wide computer networks, Intranets, and the Internet. In one embodiment, remote computer 276 executes an Internet Web browser program such as the "Internet Explorer" Web browser manufactured and distributed by Microsoft Corporation of Redmond, Washington to access and utilize online services.

When used in a LAN networking environment, computer 202 is connected to the local network 280 through a network interface or adapter 284. When used in a WAN networking environment, computer 202 typically includes a modem 286 or other means for establishing communications over the wide area network 282, such as the Internet. The modem 286, which may be internal or external, is connected to the bus 236 via input/output (I/O) interface 256. In addition to network connectivity, I/O interface 256 also supports one or more printers 288. In a networked environment, program modules depicted relative to the personal computer 202, or portions thereof, may be stored in the remote memory storage device. It will be appreciated that the network connections shown are exemplary and other means of establishing a communications link between the computers may be used.

Generally, the data processors of computer 202 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory.

For purposes of illustration, programs and other executable program components such as the operating system are illustrated herein as discrete blocks, although it is recognized that such programs and components reside at various times in different storage components of the computer, and are executed by the data processor(s) of the computer.

It should be appreciated that although depicted as a separate, stand alone application in FIG. 2, video skim agent 204 may well be implemented as a function of a higher level application. Such applications include, but are not limited to, browsers, video software editing products, VCR control systems, MPEG ripper applications, and so forth.

Exemplary Video Skim Agent 204

Figure 3:
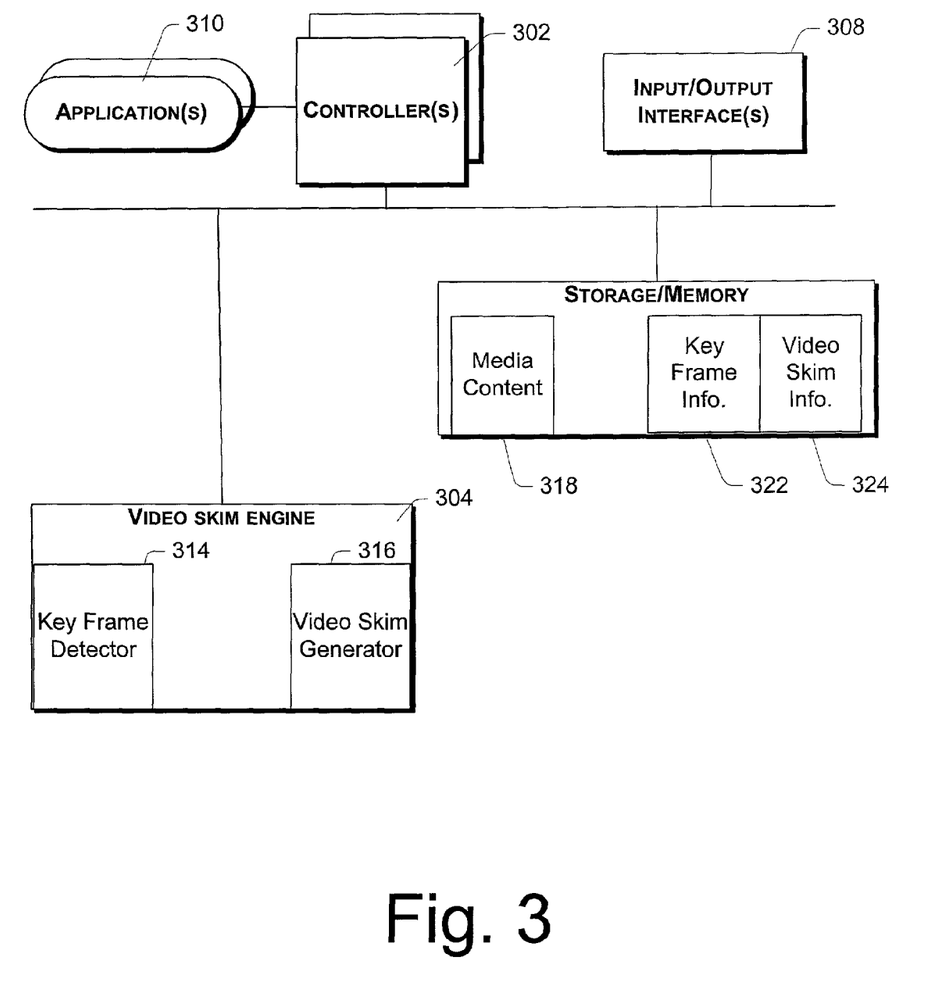
FIG. 3 illustrates a block diagram of an example video skim agent.

FIG. 3 illustrates a block diagram of an example video skim agent 204. In this example, video skim agent 204 is depicted comprising one or more controller(s) 302, a video skim engine 304, memory/storage device 306, input/output interface(s) 308 and, optionally, one or more applications 310, each communicatively coupled as shown. Video skim agent 204 analyzes a video such as 102 shown in FIG. 1 and is capable of summarizing the salient content of frames of video by producing a condensed video skim(s) 104, while preserving the original frame rate of the video.

As shown in the exemplary implementation of FIG. 3, the video skim engine 304 invokes a key frame detector 314 and a video skim generator 316. The key frame detector 314 is invoked to identify (i.e., extract) one or more key frames from a segment of frames comprising the entire video sequence of frames, such as 102. A "key frame" is the frame that represents the salient content of the segment of frames. Depending on the content complexity of the segment of frames, one or more key frames can be extracted.

Figure 4:
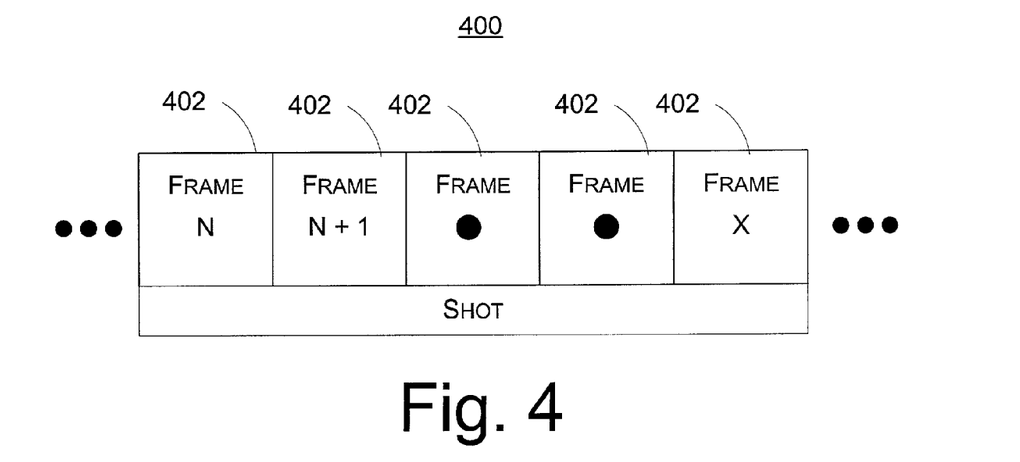
FIG. 4 illustrates a representative video shot containing a segment of frames.

In one implementation, the segment of frames can be a video shot. A video shot is defined as an unbroken sequence or segment of frames in a video sequence, and often defines building blocks of a video. For example, FIG. 4 illustrates a representative video shot 400 containing frames 402 from frame N to frame X. A shot can represent any particular video content. Most shots have defined boundaries which can be defined by threshold deviations in content. In most instances, using video shots makes producing a video skim more accurate, because the video skim is made from a single content of information. Nevertheless, one or more key frames can be extracted from other segments of frames of various defined lengths that are not necessarily defined by content.

Once the key frame(s) is extracted from a video shot, the video skim generator 314 is invoked to analyze the visual content information surrounding the key frame. In particular, the generator 314 measures visual content variety on both sides of the key frame. Depending upon the visual variety variance measured on both sides, the generator 314 selects a greater amount of frames corresponding to a greater amount of visual variety on one side of the key frame than the other, to form the video skim. The video skim generator 316 will be described with greater detail below.

According to one implementation, controller(s) 302 receive media content from any of a number of sources including, for example, local memory storage 306, remote media provider(s) and/or content storage source(s), and audio/video devices communicatively coupled to video skim agent 304.

According to one implementation, the media content is received from remote sources by controller(s) 302 and placed in storage/memory 306 for analysis. According to one implementation, the media is received by the computer 202 in compressed form and is decompressed before presentation to video skim agent 204. In an alternate implementation, controller(s) 202 selectively invoke a decoder application resident within applications 310 or outside of video skim agent 204 to decode media received in compressed form before selectively invoking the video skim engine 304.

Controller(s) 302 is intended to represent any of a wide variety of control logic known in the art such as, for example, a processor, an application specific integrated circuit (ASIC), a field programmable gate array (FPGA), a programmable logic array (PLA), and the like. Moreover, it should be appreciated that controller(s) 302 may well be implemented in software as a plurality of executable instructions which, when executed (e.g., by processing unit 232), implement the control functions described above.

Storage/memory 306 is utilized by video skim agent 204 to maintain, at least temporarily, media content 318, key frame information 322, and video skim information 324. The I/O interface(s) 208 enable video skim agent 204 to communicate with external elements and systems, facilitating a distributed architecture and remote operation.

Application(s) 310 are intended to include a wide variety of application(s) which may use, or be used by, video skim engine 304. In this regard, application(s) 310 may well include a graphical user interface (GUI), a media player, a media generator, a media database controller, and the like.

Given the foregoing, it is to be appreciated that video skim agent 204 can be implemented in a number of alternate ways. According to one implementation, video skim agent 304 is implemented in software as a stand-alone application, as a subset of a higher-level multimedia application such as, for example, a media decoder application, a media rendering application, a browser application, a media player application, and the like. Alternatively, video skim agent 204 may well be implemented in hardware, e.g., in an application specific integrated circuit (ASIC), a controller, a programmable logic device (PLD), in a multimedia accelerator peripheral, and the like.

Key Frame Detector 314

Having introduced the operating environment and functional elements of video skim agent 204 with reference to FIGS. 1-4, above, the operation of the system will now be developed more fully below starting with the key frame detector 314.

Figure 5:
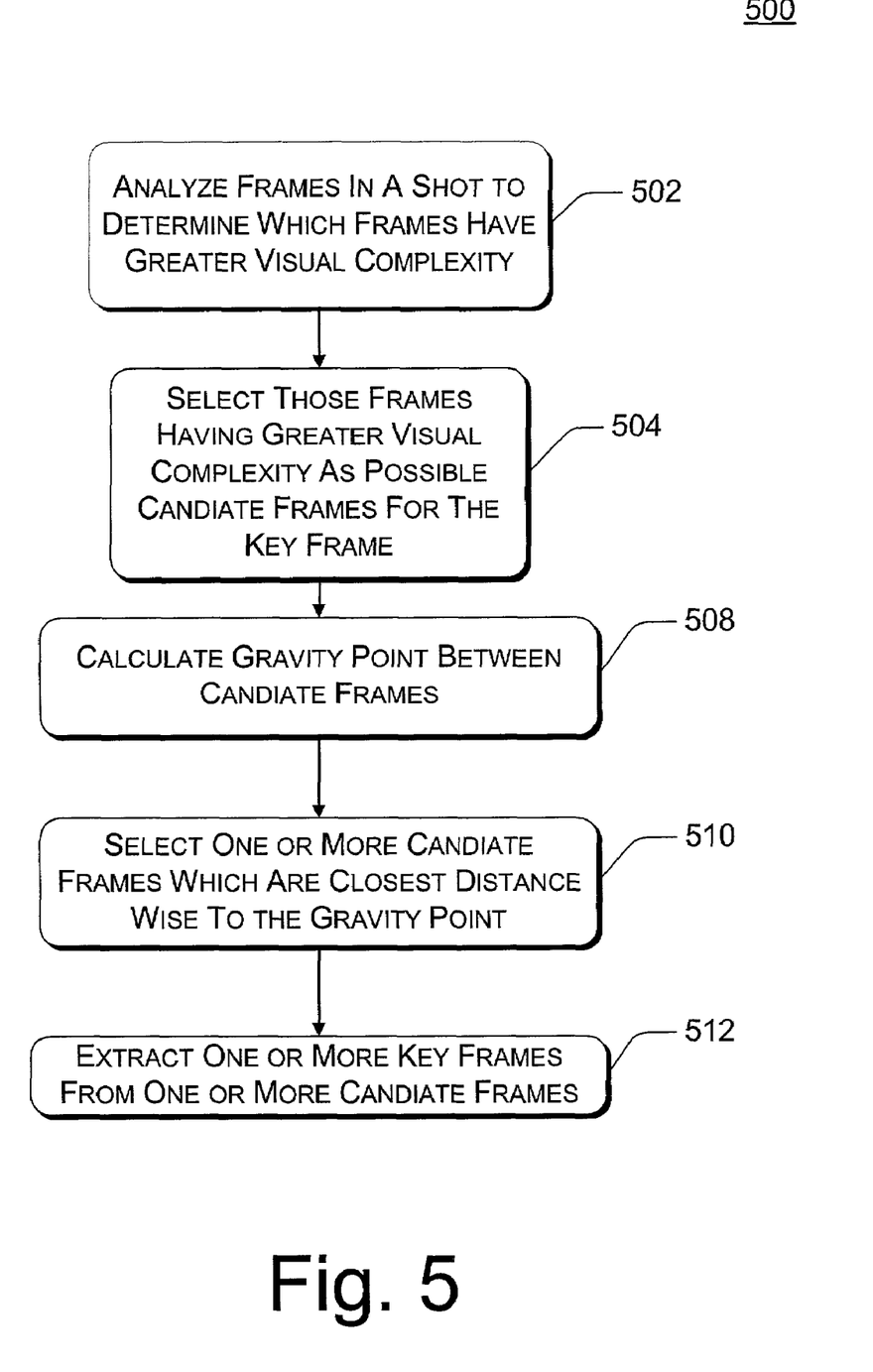
FIG. 5 is a flow chart illustrating a process for extracting one or more key frames from a video shot.

FIG. 5. is a flow chart illustrating a process 500 for extracting one or more key frames from a video shot. Process 500 is invoked by the key frame detector 314. Process 500 includes steps 502-512. In steps 502 and 504, the key frame detector 314 analyzes frames 402 in a shot 400 to determine which frames have greater visual content complexity and selects those frames having greater visual complexity as candidate frames for the key frame. Each frame that has a greater visual content complexity is a potential candidate for the key frame, referred to herein as a key frame candidate. To determine which frames have greater visual complexity, the key frame detector 314 chooses the first frame N (shown in FIG. 4) as a potential key frame candidate. The key frame detector 314 compares the first frame N to the last frame X. If a significant content changes occurs between these two frames, then the first frame N will be selected as a key frame candidate.

In one implementation, the first frame of a current shot is selected as the first candidate frame. The first frame is also used as reference frame compared to the following frames of the shot. If a significant content change occurs from between N and the reference frame, then frame N is identified (selected) as the next candidate frame as well as well as the next reference frame. This process repeats until the last frame of the current shot is reached. In other words, the process repeats until a frame is selected where there is not a significant content change. So by the time all the frames are compared for content complexity, there can be several candidate frames selected for nomination of the key frame. Each selected frame is represented as color histogram, that is, each frame corresponds to a point in a color histogram feature of space. In color histogram featured space, these candidate frames represent "corner points," where there is a significant content change between two adjacent corner points in feature space.

Figure 6:
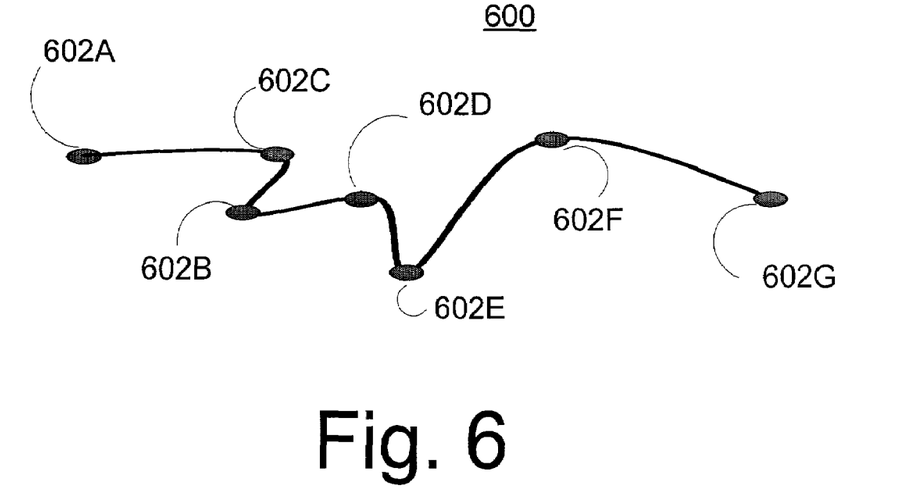
FIG. 6 is a histogram feature of space that shows several candidate frames from a shot.

FIG. 6 is a histogram feature of space 600 that shows several candidate frames (as corner points) 602 of shot 400.

Figure 7:
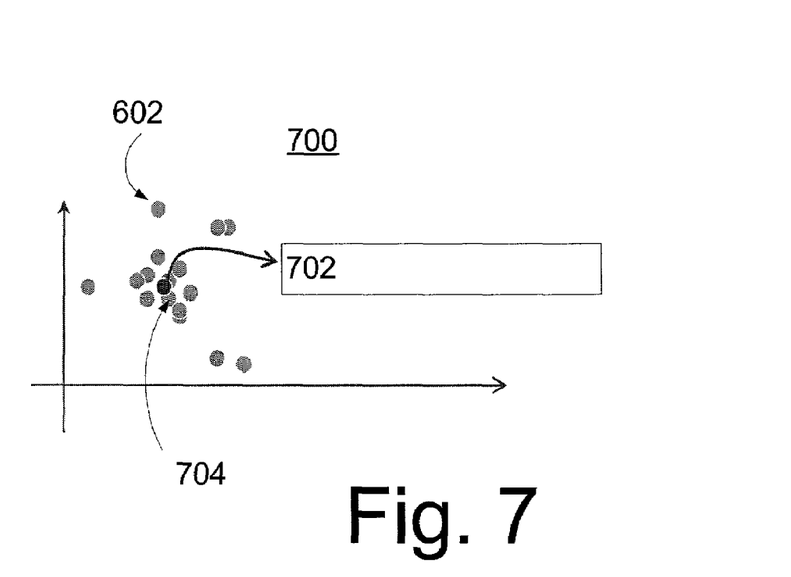
FIG. 7 is a histogram feature of space showing all the candidate frames with a calculated gravity point.

Next, in step 508, key frame detector 314 calculates a gravity point between candidate frames. Calculating an average point of all candidate frames represented as corner points in histogram featured space, provides the gravity point. That is, the average distance between all of the corner points is the "gravity point." FIG. 7 is a histogram feature of space 700 showing all the candidate frames (represented as corner points in space) with a calculated gravity point 702.

In step 510, key frame detector 314, selects K candidate frames with the shortest distance to the gravity point 702, where K is the number of key frames selected from the shot 400. Depending on the content complexity of the shot 400, one or more key frames can be selected. Nevertheless, the candidate frame in space 602 that likely represents the more salient visual information of the whole shot, is the one that is nearest to the gravity point 702. Key frames of the shot generally represent the most important information of the shot 400. In the illustration of FIG. 7, candidate frame 704 represents the key frame of shot 400, because it is the closest to gravity point 702.

In step 512, the one (or more) key frame from step 510 is extracted as the key frame. For instance, out of the candidate frames 602, key frame 704 is extracted by the key frame detector 314. Once the key frame 704 is extracted, a video skim can be assembled the video skim generator 316.

Video Skim Generator 316

Figure 8:
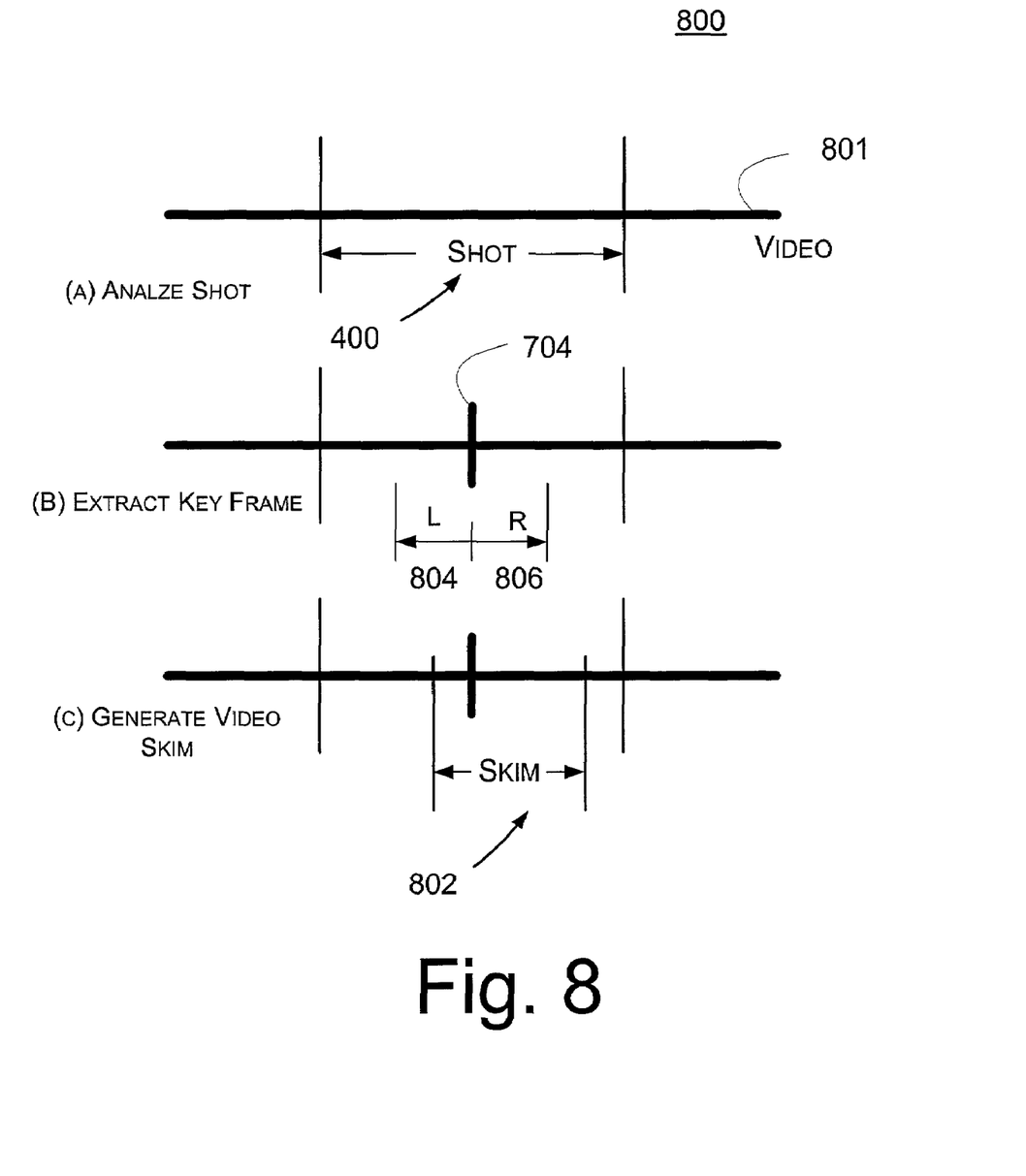
FIG. 8 is a diagram of three exemplary stages for generating a video skim.

FIG. 8 is a diagram of three exemplary stages for generating a video skim 802. In stage A, the segment of video frames is analyzed. In this example, the segment is a shot 400 from a longer video 801. In stage B, the key frame 704 is extracted from the shot 400 as was described above. Process 500 provided the key frame(s) 704 of the shot 400. In stage C, the video skim 802, which is a segment of one or more frames summarizing the shot, is generated.

Figure 9:
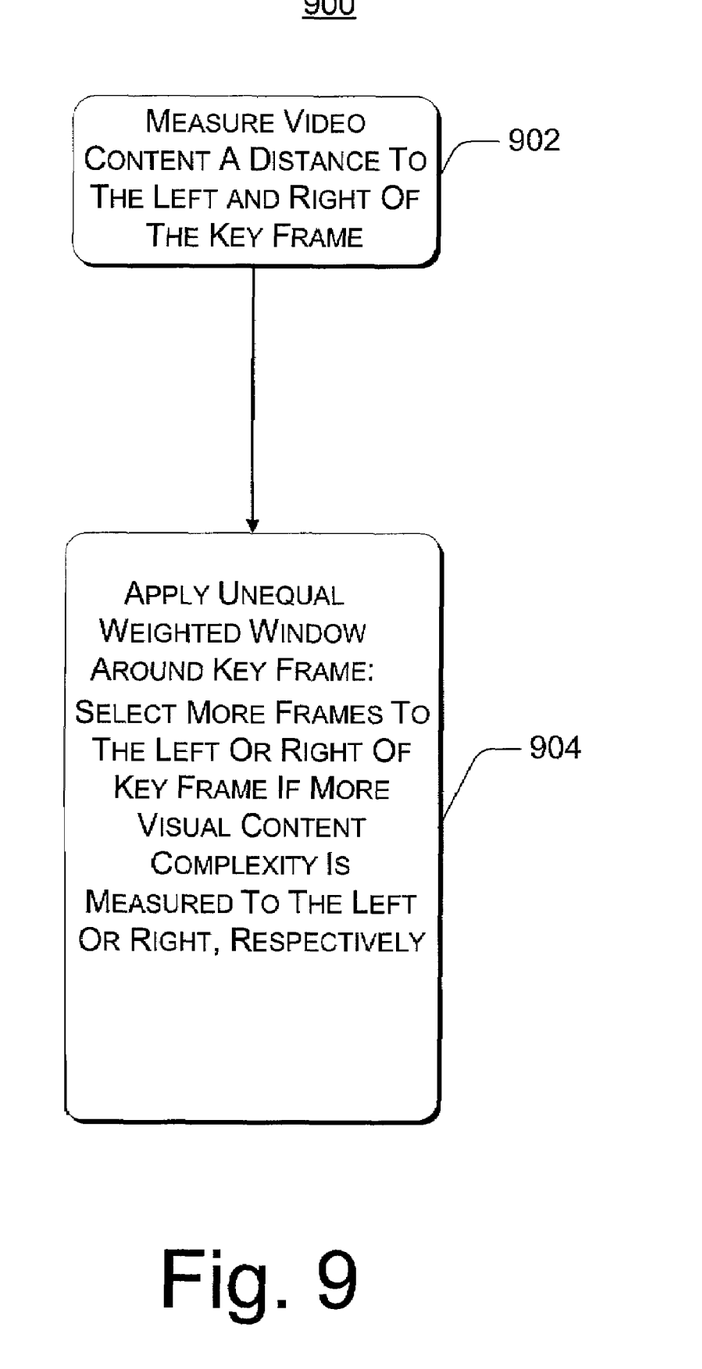
FIG. 9 is a flow chart illustrating a process for extracting a video skim from a shot.

FIG. 9 is a flow chart illustrating a process 900 for extracting a video skim from a shot. Process 900 includes steps 902 and 904. To better understand process 900, reference is also made interchangeably to FIG. 8.

Visual content of video varies greatly, even within one shot 400. Shorter video skims, however, are sufficient to summarize stationary video content such as conference video. On the other hand, a longer video should be generated to provide satisfactory representation of the visual content from dynamic video sequences, such as a sports video. Keeping this in mind, process 900 relies on the key frame 704 extracted from process 500 and measures visual content variety to determine the weight of a window to be applied on each side of the key frame 704. The length of the windows can be dynamically selected by a user depending on the content of the shot.

In step 902, video skim generator 316 measures video content an even distance to the left and right of the key frame 704. The key frame 704 is used as a reference point to measure the visual content variety from. In the exemplary implementation a the histogram difference Di represents the histogram difference of adjacent frames, which is a metric of visual content variety.

$$D_i = \sum_{j=1}^{Bins} |H_i(j) - H_{i-1}(j)| \quad \text{(EQ. 1)}$$

LDMean and RDMean are two variables for visual variance of left and right windows 804 and 806, respectively, of the current frame 704. Each window 804, 806 contain an equal amount of frames. LDMean and RDMean are defined in equations 2 and 3 as:

$$LDMean = \frac{\sum_{i=Start}^{KNum} Di}{KNum - Start} \quad \text{(EQ. 2)}$$

$$RDMean = \frac{\sum_{i=KNum}^{End} Di}{End - KNum} \quad \text{(EQ. 3)}$$

Now, in step 904, the video skim generator 316 applies an unequal weighted window of frames around to the key frame 704. By measuring both sides of the key frame 704 for visual content variety, a weight corresponding to the visual content variety can be calculated for each side of the window. A lower weight is assigned to a window of frames to the left or right of the key frame 704 that has less visual variety. A higher weight is assigned to a window of frames to the left or right of the key frame 704 with more dramatic (greater) visual variety. So, LWeight and RWeight are two variables shown in equations 4 and 5 that represent left and right ratios of total skim length. The sum of LWeight and RWeight is 100 percent.

$$LWeight = \frac{LDMean}{LDMean + RDMean} \quad \text{(EQ. 4)}$$

$$RWeight = \frac{RDMean}{LDMean + RDMean} \quad \text{(EQ. 5)}$$

For example, if the length of a shot 400 is 1000 frames and a user desires to watch one-tenth of the shot, the video skim generator 316 selects 100 frames from the 1000 frames. So, the window length to the left of key frame 704 is LLength, which is a multiple of the total skim length determined by LWeight. The window length to the right of the key frame 704 is RLength which is a multiple of the total skim length determined by RWeight: where:

$$LLength = LWeight * SkimLength \quad \text{(EQ.6)}$$

$$RLength = RWeight * SkimLength \quad \text{(EQ.7)}$$

Thus, the video skim generator 316 selects more frames to the left or right of the key frame if more visual content complexity is measured to the left or right respectively. The length of the windows left and right is determined by the total skim length, which can be dynamically selected by a user of computer 202 or pre-selected.

Referring to FIG. 8, the video skim 802 is generated that extracts the visual contents of a shot based on the visual importance of the contents. Those segments of frames to the right or left of a key frame 704 are given larger weight and higher priority in selecting the number of frames per skim per each side of the key frame. Furthermore, a user can generate video skims 802 of different lengths. Thus, it is possible for a user to make decisions on how much time to spend on given segment of video, while preserving the original video playback rate.

Computer Readable Media

An implementation of exemplary subject matter using a video skim agent as described above may be stored on or transmitted across some form of computer-readable media. Computer-readable media can be any available media that can be accessed by a computer. By way of example, and not limitation, computer readable media may comprise "computer storage media" and "communications media."

"Computer storage media" include volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method, comprising:
    identifying a key frame in a video shot, the key frame having a high visual content complexity with a left and a right side;
    wherein identifying the key frame further comprises:
    comparing frames within the video shot to obtain candidate frames;
    obtaining a gravity point by calculating an average point from the candidate frames;
    sorting the candidate frames according to a distance from the gravity point; and
    selecting K frames with a shortest distance to the gravity point;
    measuring a certain length of frames to the left and the right of the key frame for visual content variety;
    assembling a video skim having L frames to the left of the key frame and R frames to the right of the key frame, wherein the number of frames selected for L and R, respectively, is dependent upon the measured visual content variety to the left and right of the key frame; and
    selecting a maximum number of frames comprising the video skim, wherein L+R equal the maximum number of frames;
    wherein L and R each represent a finite integer greater than or equal to zero.

2. The method as recited in claim 1, wherein a greater number of frames is selected for L than for R, if there is more visual content variety measured to the left of the key frame than to the right of the key frame.

3. The method as recited in claim 1, wherein a greater number of frames is selected for R than for L, if there more visual content variety measured to the right of the key frame than to the left of the key frame.

4. The method as recited in claim 1, wherein identifying the key frame further comprises:
    wherein at least one of the K frames is the key frame;—
    wherein K is any integer greater than zero.

5. One or more computer-readable storage media comprising computer-executable instructions that, when executed, perform the method as recited in claim 1.

6. A method skimming a video shot containing a plurality of frames, comprising:
    identifying a key frame in a video shot, the key frame having a high visual content complexity;
    wherein identifying the key frame further comprises:
    comparing frames within the video shot to obtain candidate frames;
    obtaining a gravity point by calculating an average point from the candidate frames;
    sorting the candidate frames according to a distance from the gravity point;
    selecting K frames with a shortest distance to the gravity point;
    extracting a the key frame from the Video shot, the key frame having a left and right side;
    measuring video content complexity of frames to the left and right of the key frame;
    extracting a video skim from the video shot based on the measured video content complexity of the frames to the left and right of the key frame, wherein the video skim represents salient content of the shot; and
    selecting a maximum number of frames comprising the video skim, wherein the left and the right of the key frame equal the maximum number of frames.

7. The method as recited in claim 6, wherein measuring the video content complexity of the frames comprises calculating a histogram difference of adjacent frames to the left and right of the key frame.

8. The method as recited in claim 6, wherein extracting the video skim further comprises selecting more of the frames to the left of the key frame than to the right of the key frame, if more video content complexity is measured to the left of the key frame.

9. The method as recited in claim 6, wherein extracting the video skim further comprises selecting more of the frames to the right of the key frame than the to the left of the key frame, if more video content complexity is measured to the right of the key frame.

10. The method as recited in claim 6, wherein the video skim has a total length of L frames selected by a user, wherein L is any, integer greater than zero.

11. The method as recited in claim 6, wherein identifying the key frame further comprises:
    wherein at least one of the K frames is the key frame;
    wherein K is any integer greater than zero.

12. The method as recited in claim 6, wherein measuring video content complexity of frames to the left and right of the key frame comprises calculating visual variance to the left and right of the key frame and determining left and right total skim length ratios.

13. One or more computer-readable storage media having stored thereon a computer program that, when executed by one or more processors, causes the one or more processors to:
- identify a key frame in a video shot, the key frame having a high visual content complexity;
- wherein identifying the key frame further comprises:
  - comparing frames within the video shot to obtain candidate frames;
  - obtaining a gravity point by calculating an average point from the candidate frames;
  - sorting the candidate frames according to a distance from the gravity point;
  - selecting K frames with a shortest distance to the gravity point;
- extract the key frame from a shot containing a plurality of frames, the key frame having a left and right side;
- measure video content complexity of frames to the left and right of the key frame;
- extract a video skim from the shot based on the measured video content complexity of the frames to the left and right of the key frame, wherein the video skim represents salient content of the shot; and
- selecting a maximum number of frames comprising the video skim, wherein the left and the right side of the key frame equal the maximum number of frames.

14. One or more computer-readable storage media as recited in claim 13, wherein to measure the video content complexity of the frames, the one or more processors: calculate a histogram difference of adjacent frames to the left and right of the key frame when measuring the video content complexity of the frames.

15. One or more computer-readable storage media as recited in claim 13, wherein to extract the video skim, the one or more processors: select more of the frames to the left of the key frame than to the right of the key frame, if more video content complexity is measured to the left of the key frame.

16. One or more computer-readable storage media as recited in claim 13, wherein to extract the video skim, the one or more processors: select more of the frames to the right of the key frame than to the left of the key frame, if more video content complexity is measured to the right of the key frame.

17. One or more computer-readable storage media as recited in claim 13, wherein the video skim has a total length of L frames, wherein L is any integer greater than zero.

18. One or more computer-readable storage media as recited in claim 13, wherein to identify the key frame, the one or more processors:
- select K frames with a shortest distance to the gravity point, wherein at least one of the K frames is the key frame; wherein K is any integer greater than zero.

19. A method for extracting one or more key frames from a shot, comprising:
- identifying a key frame in a video shot, the key frame having a high visual content complexity;
- comparing frames within the video shot to obtain candidate frames;
- analyzing a plurality of frames comprising the shot to determine those frames having the greatest visual content complexity;
- calculating a point representing an average distance between those frames having the greatest visual content complexity, wherein the point comprises a gravity point;
- sorting the candidate frames according to a distance from the gravity point;
- selecting key frames with a shortest distance to the gravity point;
- extracting the key frame from the video shot, the key frame having a left and right side;
- selecting one or more frames, from those frames having the greatest visual content complexity, which are nearest to the calculated point, wherein the one or more selected frames nearest to the calculated point, represent the one or more key frames for extraction and
- selecting a maximum number of frames comprising the video skim, wherein the one or more key frames comprise a left and a right to equal the maximum number of frames.

20. A system comprising:
- a processor
- a memory coupled to the processor;
- a key frame detector coupled to the memory, configured to analyze one or more attributes associated with visual content complexity of video frames within a shot and extract a key frame having the greatest visual content complexity within the shot; and
- wherein the key frame detector extracts a key frame having the greatest visual content complexity within the shot boundary by:
  - analyzing a plurality of frames comprising the shot to determine those frames having the greatest visual content complexity;
  - calculating a point representing an average distance between those frames having the greatest visual content complexity; and
  - selecting one or more frames, from those frames having the greatest visual content complexity, which are nearest to the calculated point, wherein the one or more selected frames nearest to the calculated point, represent the one or more key frames for extraction;
- a video skim generator coupled to the memory, configured to apply an unequal weighted window of frames surrounding the key frame based on measured visual content variety observed a length of frames left and right of the key frame, and to generate a video skim consisting of the unequal weighted window of frames
- wherein the video skim generator selects a maximum number of frames comprising the video skim, wherein the one or more key frames comprise a left and a right to equal the maximum number of frames.

21. The system as recited in claim 20, wherein if the video skim generator measures a greater visual content variety to the left of the key frame then a greater length of frames to left of the key frame than to the right of the key frame are selected to be applied to the unequal weighted window of frames surrounding the key frame.

22. The system as recited in claim 20, wherein if the video skim generator measures a greater visual content variety to the right of the key frame then a greater length of frames to right of the key frame than to the left of the key frame are selected to be applied to the unequal weighted window of frames surrounding the key frame.

23. The system as recited in claim 20, wherein the system is a multimedia-processing device.

24. One or more computer-readable storage media having stored thereon a computer program that, when executed by one or more processors, causes the one or more processors to:
- analyze one or more attributes associated with visual content complexity in video frames within a shot and extract a key frame having the greatest visual content complexity within the shot boundary;

compare frames within the shot to ascertain those frames representing a greater content change from other frames in the shot boundary;

apply an unequal weighted window of frames surrounding the key frame based on measured visual content variety observed to a length of frames left and right of the key frame, to generate a video skim consisting of the unequal weighted window of frames; and extract the key frame having the greatest visual content complexity within the shot, wherein the extract causes the one or more processors to:

compare frames within the shot to ascertain those frames representing a greater content change from other frames in the shot boundary;

calculate the average distance point between those frames representing the greater content change, wherein the point comprises a gravity point; and select the frame from those frames representing the greater content change closest to the calculated average distance point, the gravity point;

select a maximum number of frames comprising the video shot, wherein the one or more key frames comprise a left and a right to equal the maximum number of frames.

25. One or more computer-readable storage media as recited in claim 24, wherein if a greater visual content variety is measured to the left of the key frame, the one or more processors: applies a greater length of frames to the left of the key frame than to the right of the key frame.

26. One or more computer-readable storage media as recited in claim 24, wherein if a greater visual content variety is measured to the right of the key frame, the one or more processors: applies a greater length of frames to the right of the key frame than to the right of the key frame.

27. A method for creating a video skim of a video shot comprising:

selecting a key frame from a plurality of frames comprising the video shot, the key frame representing salient content of the shot;

wherein selecting the key frame comprises:

comparing each the plurality of frames composing the video shot to determine which have greater visual content than others;

selecting those frames having the greater visual content;

calculating an average distance point between those frames having the greater visual content;

selecting the frame closest to the average distance point as the key frame positioning a window around the key frame, wherein the window provides boundary distances to the right and left of the key frame, wherein the distances to the right and left of the key frame are unequal with a greater distance associated with those frames in proximity to the key frame having greater video content complexity than those frames in proximity to the key frame having less video content complexity; and selecting a maximum number of frames comprising the video skim, wherein the left and the right of the key frame equal the maximum number of frames.

28. The method as recited in claim 27, further comprising permitting a user to select how many frames comprise the window.

29. One or more computer-readable storage media comprising computer-executable instructions that, when executed, perform the method as recited in claim 27.

* * * * *